United States Patent
Ganesan

(10) Patent No.: US 11,113,088 B2
(45) Date of Patent: Sep. 7, 2021

(54) GENERATING AND MANAGING GROUPS OF PHYSICAL HOSTS ASSOCIATED WITH VIRTUAL MACHINE MANAGERS IN AN INFORMATION HANDLING SYSTEM

(71) Applicant: DELL PRODUCTS, L.P., Round Rock, TX (US)

(72) Inventor: Vaideeswaran Ganesan, Bangalore (IN)

(73) Assignee: Dell Products, L.P., Round Rock, TX (US)

(*) Notice: Subject to any disclaimer, the term of this patent is extended or adjusted under 35 U.S.C. 154(b) by 316 days.

(21) Appl. No.: 15/659,740

(22) Filed: Jul. 26, 2017

(65) Prior Publication Data

US 2019/0034215 A1    Jan. 31, 2019

(51) Int. Cl.
  *G06F 9/455*    (2018.01)
  *G06F 15/173*   (2006.01)
  *G06F 9/50*     (2006.01)

(52) U.S. Cl.
  CPC ........ *G06F 9/45558* (2013.01); *G06F 9/5077* (2013.01); *G06F 15/17331* (2013.01); *G06F 2009/4557* (2013.01); *G06F 2009/45579* (2013.01); *G06F 2009/45595* (2013.01)

(58) Field of Classification Search
  CPC ............... G06F 9/45558; G06F 9/5077; G06F 15/17331; G06F 2009/4557; G06F 2009/45595; G06F 2009/45579
  See application file for complete search history.

(56) References Cited

U.S. PATENT DOCUMENTS

| | | | | |
|---|---|---|---|---|
| 9,075,661 | B2* | 7/2015 | Hopmann | G06F 9/505 |
| 10,412,066 | B1* | 9/2019 | Vemuri | G06F 9/45533 |
| 2006/0136653 | A1* | 6/2006 | Traut | G06F 9/5066 711/6 |
| 2009/0055507 | A1* | 2/2009 | Oeda | G06F 9/4856 709/216 |
| 2011/0173302 | A1* | 7/2011 | Rider | G06F 9/44505 709/220 |
| 2011/0225277 | A1* | 9/2011 | Freimuth | G06F 9/45558 709/223 |
| 2013/0046892 | A1* | 2/2013 | Otani | G06F 15/173 709/226 |
| 2015/0095424 | A1* | 4/2015 | Shimada | G06F 11/0766 709/204 |
| 2015/0363216 | A1 | 12/2015 | Sampathkumar et al. | |

(Continued)

*Primary Examiner* — Meng Ai T An
*Assistant Examiner* — Michael W Ayers
(74) *Attorney, Agent, or Firm* — Isidore PLLC

(57) ABSTRACT

A method, an information handling system (IHS), and a host group generating system for collecting information about host groups in a cluster of IHSs using a management controller. The method includes retrieving, from a controller memory, first target physical hosts that are part of a virtual machine manager (VMM) host group, but not on a VMM host list and retrieving second target physical hosts that are part of the VMM host list, but not part of the VMM host group. The method further includes transmitting, to each of the first target physical hosts, a request to detach from the VMM host group. The method further includes transmitting, to each of the second target physical hosts, a request to attach to the VMM host group.

17 Claims, 8 Drawing Sheets

(56) References Cited

U.S. PATENT DOCUMENTS

| | | | |
|---|---|---|---|
| 2015/0372867 A1* | 12/2015 | Amann | H04L 67/1097 709/221 |
| 2016/0041881 A1* | 2/2016 | Simoncelli | G06F 11/1438 714/16 |
| 2016/0253194 A1* | 9/2016 | Kolesnik | G06F 9/45558 718/1 |
| 2016/0321095 A1 | 11/2016 | Cropper et al. | |
| 2017/0054606 A1 | 2/2017 | Cropper et al. | |
| 2018/0139150 A1* | 5/2018 | Jain | H04L 47/765 |

* cited by examiner

GENERATING AND MANAGING GROUPS OF PHYSICAL HOSTS ASSOCIATED WITH VIRTUAL MACHINE MANAGERS IN AN INFORMATION HANDLING SYSTEM

BACKGROUND

1. Technical Field

The present disclosure generally relates to information handling systems and in particular to generating host groups in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

Cloud computing is a type of internet based computing that provides shared computer processing resources and data to computers and other devices on demand. Cloud computing can utilize clusters and virtual machines to provide access to a shared pool of configurable computing resources. Virtual machines are software-based emulations of physical computers. Although virtual machines are software-based emulations, the emulations utilize physical resources in physical machines referred to as host computers. The host computers can be divided into logical groups, referred to as host groups, which can be used to implement certain constraints or preferences regarding the placement of virtual machines on the host computers. Host computers can be connected by a network to form a cluster and host groups can be used to divide a large cluster into more manageable units without having to create multiple clusters.

Host computers can contain a management controller that can be used to remotely configure and diagnose problems in the host computer. Unfortunately, the management controller in the host computer does not have knowledge of the host group configuration. In other words, the management controller does not have knowledge of how host computers are grouped and formed as clusters, and which host computers are running specific virtual machines. This lack of knowledge about the host group configuration can cause errors to occur when the system is configured or modified through the management controller.

BRIEF SUMMARY

Disclosed are a method, an information handling system (IHS), and a host group generating system for generating host groups in a cluster of IHSs.

According to one embodiment, a computer-implemented method for generating host groups in a cluster of IHSs is disclosed. The method includes retrieving, from a controller memory, first identifying data of a plurality of first target physical hosts that are part of a virtual machine manager (VMM) host group, but not on a VMM host list and retrieving second identifying data of a plurality of second target physical hosts that are part of the VMM host list, but are not part of the VMM host group. The method further includes transmitting to each of the first target physical hosts that are part of the VMM host group, but not on the VMM host list, a request to detach from the VMM host group. The method further includes transmitting to each of the second target physical hosts that are part of the VMM host list, but are not part of the VMM host group, a request to attach to the VMM host group.

According to another embodiment, an IHS includes a processor communicatively coupled to a system memory. A remote access controller (RAC) is communicatively coupled to the processor and to a RAC memory device. The RAC includes first firmware executing thereon for generating host groups. The first firmware configures the RAC to retrieve first identifying data of a plurality of first target physical hosts that are part of a virtual machine manager (VMM) host group, but not on a VMM host list and retrieve second identifying data of a plurality of second target physical hosts that are part of the VMM host list, but are not part of the VMM host group. The first firmware further configures the RAC to transmit to each of the first target physical hosts that are part of the VMM host group, but not on the VMM host list, a request to detach from the VMM host group. The first firmware further configures the RAC to transmit to each of the second target physical hosts that are part of the VMM host list, but are not part of the VMM host group, a request to attach to the VMM host group.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
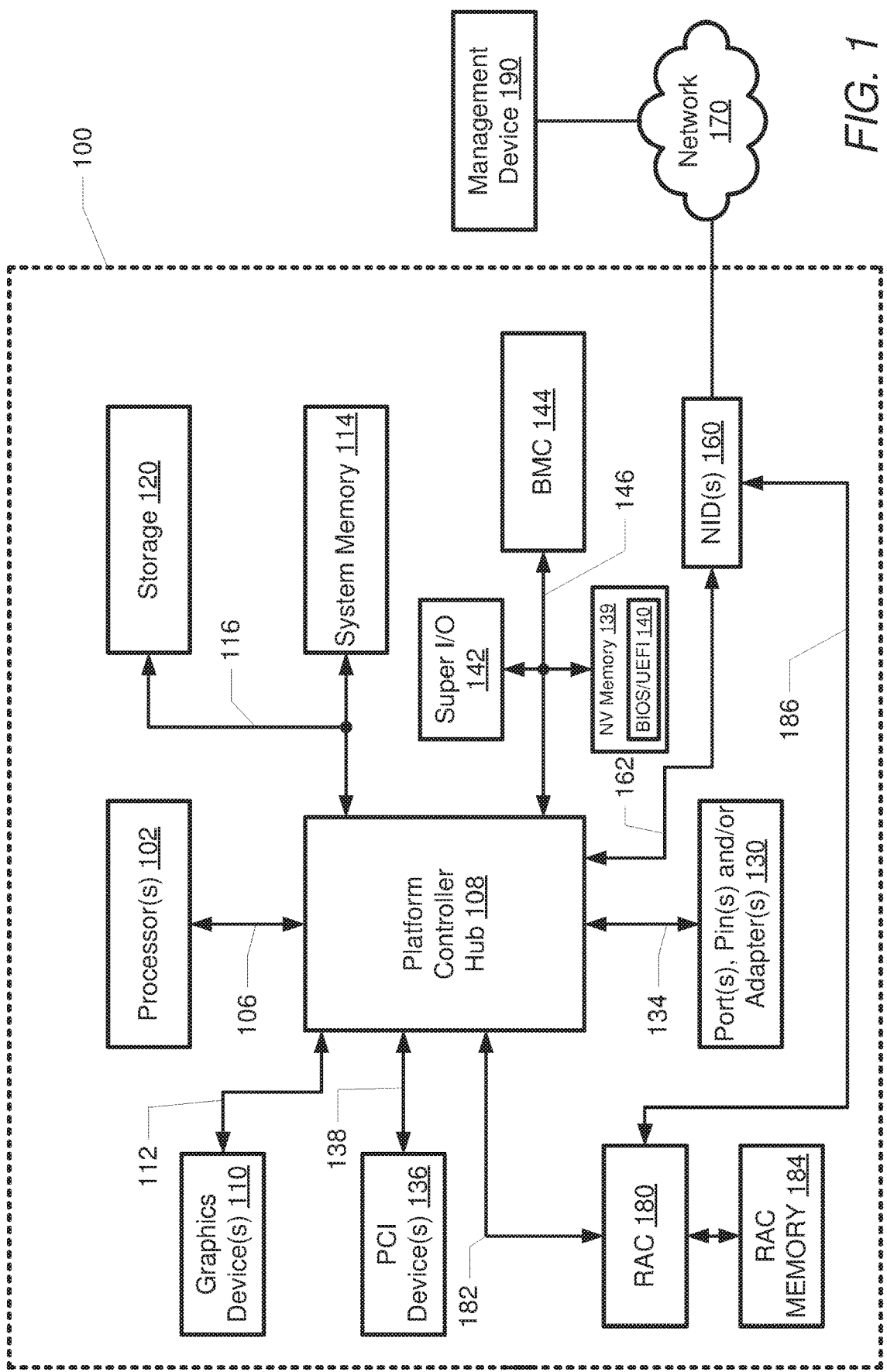
FIG. 1 illustrates one example of an IHS within which various aspects of the disclosure can be implemented, according to one or more embodiments.

The illustrative embodiments provide a method, an information handling system (IHS) and a host group generating system for generating host groups in a cluster of NIS s.

According to one embodiment, the method includes retrieving, from a controller memory, first identifying data of a plurality of first target physical hosts that are part of a virtual machine manager (VMM) host group, but not on a VMM host list and retrieving second identifying data of a plurality of second target physical hosts that are part of the VMM host list, but are not part of the VMM host group. The method further includes transmitting to each of the first target physical hosts that are part of the VMM host group, but not on the VMM host list, a request to detach from the VMM host group. The method further includes transmitting to each of the second target physical hosts that are part of the VMM host list, but are not part of the VMM host group, a request to attach to the VMM host group.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, an example of an IHS 100 is shown. IHS 100 includes one or more processor(s) 102. In various embodiments, IHS 100 may be a single-processor system including one processor 102, or a multi-processor system including two or more processor(s) 102 (e.g., two, four, eight, or any other suitable number). Processor(s) 102 may include any processor capable of executing program instructions. In an embodiment, a motherboard is provided, configured to provide structural support, power, and electrical connectivity between the various aforementioned components. Such a motherboard may include multiple connector sockets in various configurations, adapted to receive pluggable circuit cards, component chip packages, etc.

Processor(s) 102 are coupled to platform controller hub (PCH) or chipset 108 via front-side bus 106. PCH 108 may be configured to coordinate I/O traffic between processor(s) 102 and other components. For example, in this particular implementation, PCH 108 is coupled to graphics device(s) 110 (e.g., one or more video cards or adaptors, etc.) via a graphics bus 112 (e.g., an Accelerated Graphics Port or AGP bus, a Peripheral Component Interconnect (PCI) bus, etc.). PCH 108 is also coupled to system memory 114 via memory bus 116. Memory 114 may be configured to store program instructions and/or data accessible by processor(s) 102. In various embodiments, memory 114 may be implemented using any suitable memory technology, such as static RAM (SRAM), synchronous dynamic RAM (SDRAM), nonvolatile/Flash-type memory, or any other type of memory.

Also coupled to memory bus 116 is a storage device or storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 114 during operation of IHS 100.

PCH 108 is also coupled to one or more PCI devices 136 (e.g., modems, network cards, sound cards, video cards, shared memory etc.) via a PCI bus 138. PCH 108 is further coupled to port(s), pin(s), and/or adapter(s) 130 over a bus 134. Generally, PCH 108 may be configured to handle various I/O operations, and PCH 108 may provide interfaces such as, for instance, Universal Serial Bus (USB), audio, serial, parallel, Ethernet, etc., via port(s), pin(s), and/or adapter(s) 130 over bus 134. For example, PCH 108 may be configured to allow data to be exchanged between IHS 100 and other devices, such as other IHSs attached to a network. In various embodiments, PCH 108 may support communication via wired or wireless general data networks, such as any suitable type of Ethernet network, via telecommunications/telephony networks, such as analog voice networks or digital fiber communications networks, via storage area networks such as Fiber Channel SANs, or via any other suitable type of network and/or protocol.

PCH 108 may also enable connection to one or more input devices, such as keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. PCH 108 is also coupled to non-volatile (NV) memory 139 that stores basic input output system/unified extensible firmware interface (BIOS/UEFI) 140, super I/O Controller 142, and baseboard management controller (BMC) 144 via Low Pin Count (LPC) bus 146.

BIOS/UEFI 140 includes non-volatile memory having program instructions stored thereon. Those instructions may be usable by processor(s) 102 to initialize and test other hardware components and/or to load an Operating System (OS) onto IHS 100. As such, (BIOS/UEFI) 140 may include a firmware interface that allows processor(s) 102 to load and execute certain firmware, as described in more detail below. In some cases, such firmware may include program code that is compatible with the Unified Extensible Firmware Interface (UEFI) specification, although other types of firmware may be used.

BMC 144 may include non-volatile memory having program instructions stored thereon that are usable by processors(s) 102 to enable remote management of IHS 100. For example, BMC 144 may enable a user to discover, configure, and manage BMC 144, setup configuration options, resolve and administer hardware or software problems, etc. Additionally or alternatively, BMC 144 may include one or more BMC firmware volumes, each volume having one or more firmware files used by the BIOS' firmware interface to initialize and test components of IHS 100. Super I/O Controller 142 combines interfaces for a variety of lower bandwidth or low data rate devices. Those devices may include, for example, floppy disks, parallel ports, a keyboard and mouse and other devices.

In some cases, IHS 100 may be configured to access different types of computer-accessible media separate from memory 110. Generally speaking, a computer-accessible memory device may include any tangible, non-transitory storage media or memory media such as electronic, magnetic, or optical media (e.g., magnetic disk, a hard drive, a CD/DVD-ROM, a Flash memory, etc.) coupled to IHS 100 via PCH 108.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

IHS 100 further comprises one or more network interface devices (NID(s)) 160 coupled to PCH 108 via a second PCI bus 162. NID(s) 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices, as well as a more complex set of interconnections as can exist within a wide area network, such as the Internet.

IHS 100 further includes a remote access controller (RAC) 180 coupled via a next PCI bus 182 to PCH 108. RAC 180 provides management functions that allow an administrator to deploy, monitor, manage, configure, update, troubleshoot, and/or remediate IHS 100. RAC 180 is also coupled to RAC memory 184. In one embodiment, RAC memory 184 can be shared with processor(s) 102. RAC 180 is also communicatively coupled to NID(s) 160 via a sideband bus 186. In one embodiment, RAC 180 can be a separate device from IHS 100.

RAC 180 monitors and controls the operation of IHS 100 and other systems and devices communicatively coupled to IHS 100. RAC 180 can also perform configuration and remote control of other connected IHSs. Certain software and/or firmware modules stored in RAC memory 184 can be executed by RAC 180. Processor(s) 102 and RAC 180 include specific firmware that enables processor(s) 102 and RAC 180 to perform the various functions described herein. In the illustrative embodiment, IHS 100 further comprises a management device 190 that is in communication with network 170. Management device 190 can be another IHS, a computer, a server or a management console that enables a user or operator to receive operational conditions and manage functions of IHS 100. The addition of management device 190 is an optional feature to the embodiments described herein. Notably, in other embodiments, IHS 100 can also be a management device that connects via network 170 to one or more managed devices (not shown).

A person of ordinary skill in the art will appreciate that IHS 100 is merely illustrative and is not intended to limit the scope of the disclosure described herein. In particular, any computer system and/or device may include any combination of hardware or software capable of performing certain operations described herein. For instance, although IHS 100 is illustrated following a first type architecture, various systems and methods described herein may be adapted to work with any other architecture having a different chipset and/or RAC configuration. In addition, the operations performed by the illustrated components may, in some embodiments, be performed by fewer components or distributed across additional components. Similarly, in other embodiments, the operations of some of the illustrated components may not be performed and/or other additional operations may be available.

In other implementations, one or more of the devices or components shown in FIG. 1 may be absent, or one or more other components may be added. Accordingly, systems and methods described herein may be implemented or executed with other computer system configurations.

Figure 2:
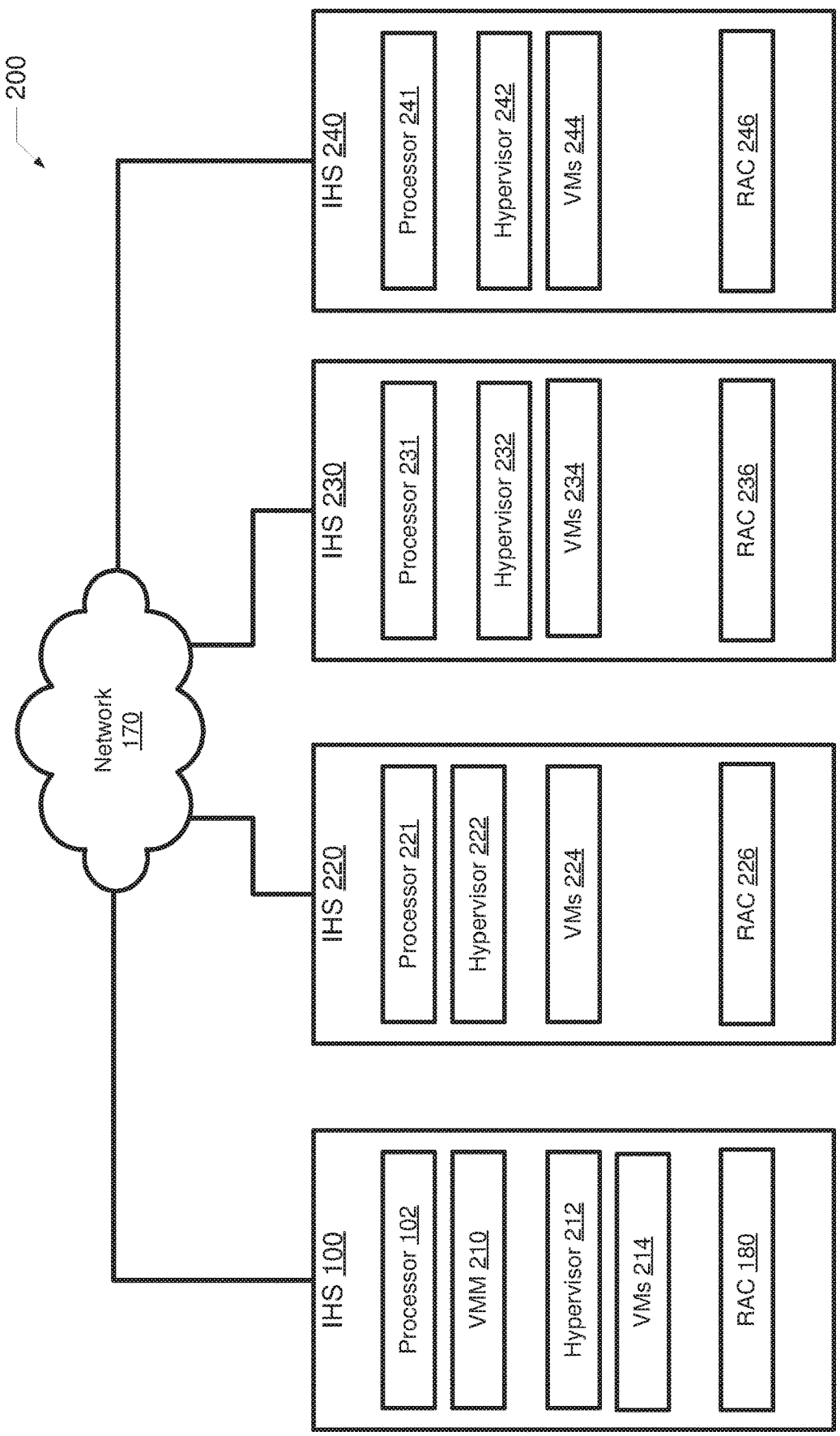
FIG. 2 illustrates an example of a cluster or networked computing system including several network-connected IHSs, according to one or more embodiments.

With reference now to FIG. 2, there is shown one embodiment of a distributed or networked computing system 200. Networked computing system 200 can also be referred to as a cluster of IHSs. In the discussion of FIG. 2 and the following figures, the description of each figure can include general reference to the specific components illustrated within the preceding figures. Networked computing system 200 includes IHS 100, IHS 220, IHS 230, IHS 240 and RAC 180. IHS 100, IHS 220, IHS 230 and IHS 240 are communicatively coupled to each other via network 170. IHS 100 can further include processor 102, a virtual machine manager (VMM) 210, a hypervisor 212 and one or more virtual machines (VMs) 214. VMM 210 is computer software/firmware that manages multiple hypervisors across multiple IHSs. VMM 210, via a hypervisor, can create, configure and run VMs across multiple IHSs within networked computing system 200. VMM 210 can efficiently allocate IHS resources to VMs. For example, VMM 210 can perform the initial placement of VMs and can dynamically migrate VMs among IHSs to balance the performance loading of the IHSs.

Hypervisor 212 is computer software/firmware that creates and runs VMs within IHS 100. Processor 102 executes hypervisor 212. An IHS on which a hypervisor runs one or more virtual machines can also be called a physical host or host IHS. The hypervisor presents the VMs with a virtual operating platform and manages the execution of operating systems. Multiple instances of a variety of operating systems may share virtualized hardware resources. VMs 214 are virtual emulations of a computer system. Virtual machines are based on computer architectures and provide the functionality of a physical computer.

IHS 220 includes processor 221, hypervisor 222, VMs 224 and RAC 226. Processor 221 executes hypervisor 222. IHS 230 includes processor 231, hypervisor 232, VMs 234 and RAC 236. Processor 231 executes hypervisor 232. IHS 240 includes processor 241, hypervisor 242, VMs 244 and RAC 246. Processor 241 executes hypervisor 242. In one embodiment, VMM 210 can control, configure and run the hypervisors and VMs within each of IHS 100, IHS 220, IHS 230 and IHS 240.

Figure 3B:
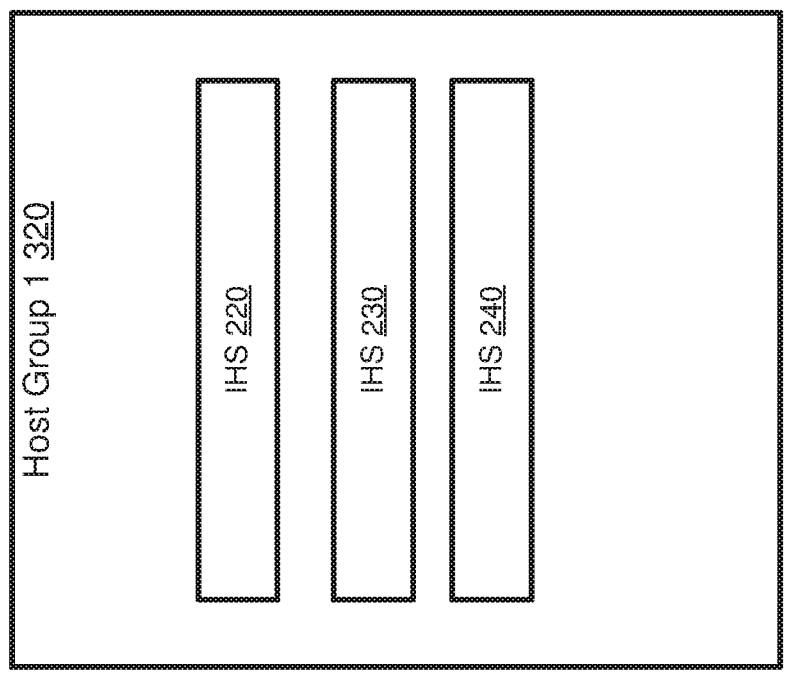
FIG. 3B illustrates an example of another host group, according to one or more embodiments.
Figure 3A:
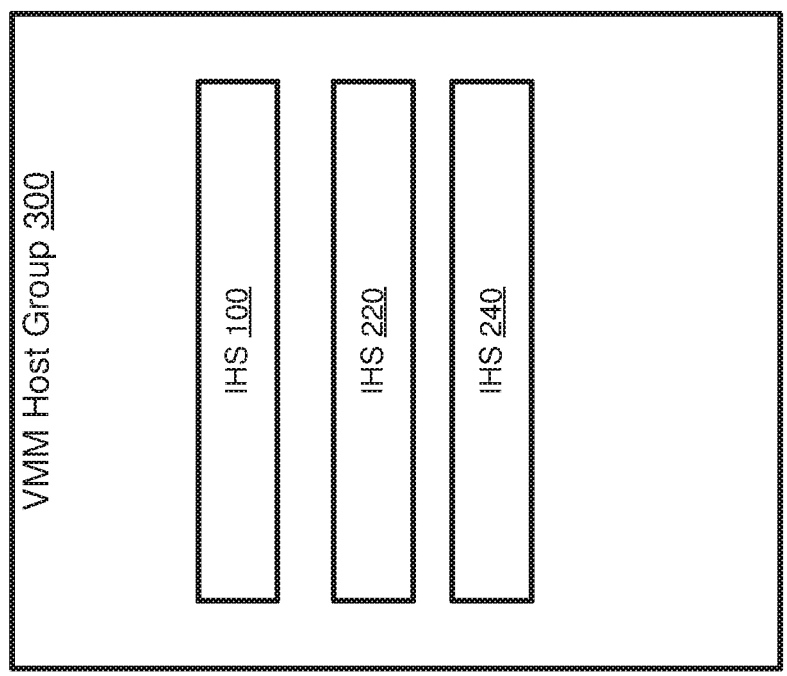
FIG. 3A illustrates an example of a virtual machine manager host group, according to one or more embodiments.

Referring to FIG. 3A, there is shown one embodiment of a VMM host group 300. Host groups are a collection of VM physical hosts or IHSs. The host groups form a set of physical hosts (IHSs) that can be configured with their virtual machines in a meaningful way. For example, host groups could be defined that contain the physical hosts associated with each division within a company or organization. Host groups can be defined by host group rules that establish criteria for the physical host computers that can be assigned to a host group. Host group rules can include, for example, affinity rules, ratio requirements, and compatibility rules. In one embodiment, VMM host group 300 can include the physical hosts that are associated with all of the VMs that are controlled by VMM 210 (i.e. IHS 100, IHS 220 and IHS 240). Turning to FIG. 3B, there is shown one embodiment of a host group 1 320. Host group 1 320 can include the physical hosts or physical IHSs, IHS 220, IHS 230 and IHS 240. In one embodiment, the members of host groups can be independent of each other. In other embodiments, the grouping of host groups can have members that are in more than one host group (overlapping).

Figure 4B:
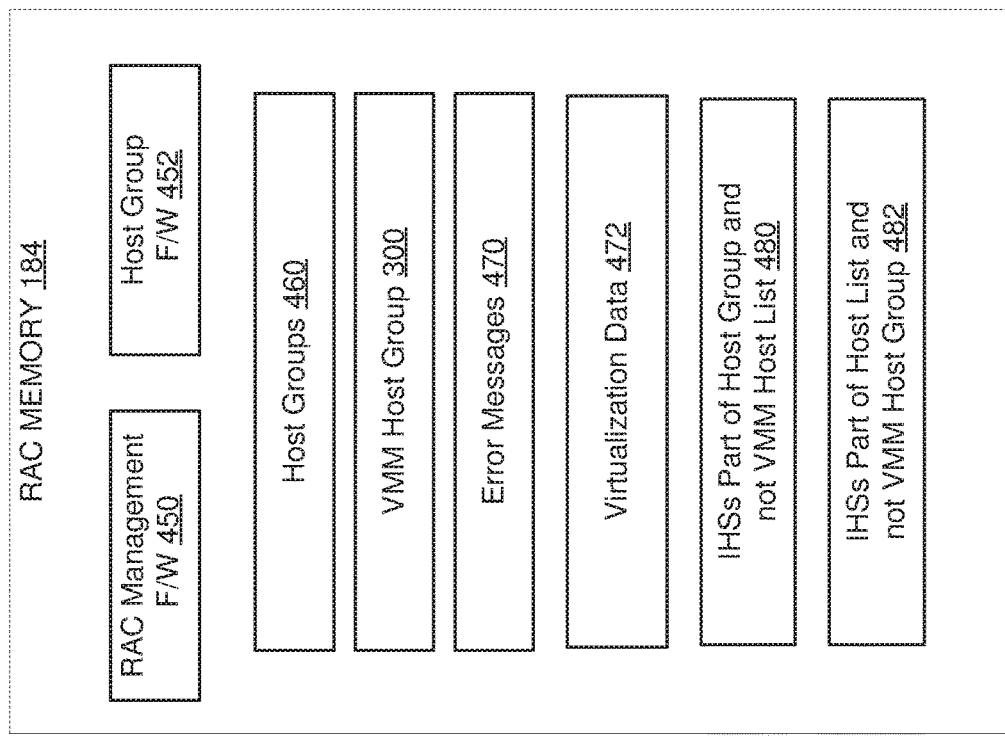
FIG. 4B illustrates example contents of a remote access controller (RAC) memory that includes firmware for generating host groups in a cluster of IHSs, in accordance with one embodiment.
Figure 4A:
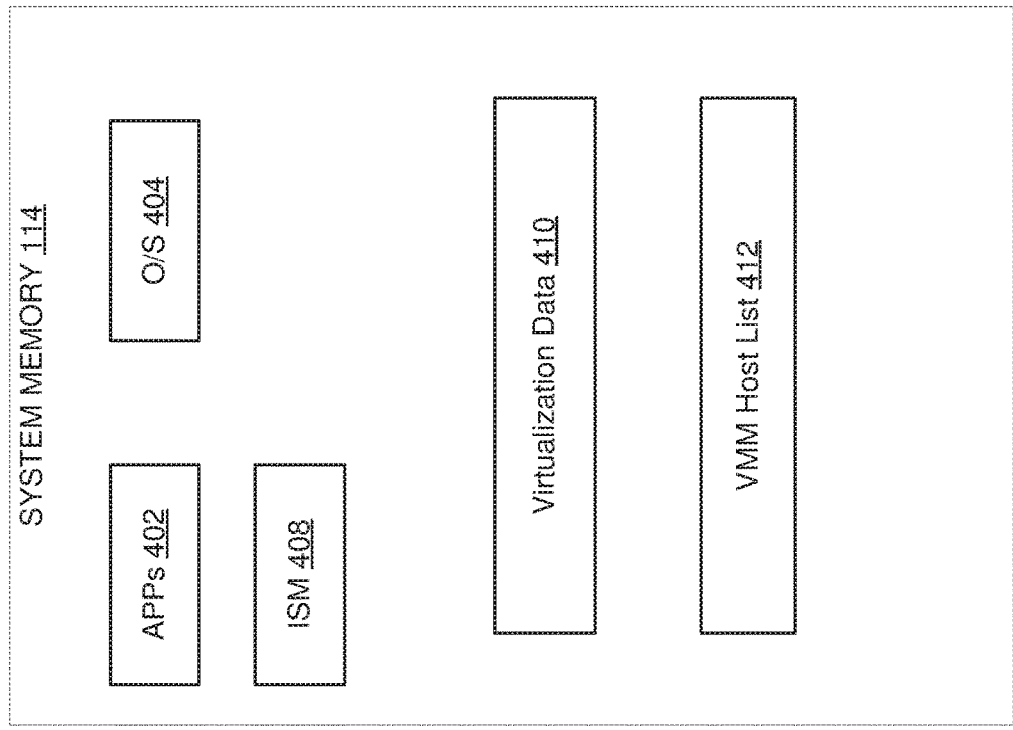
FIG. 4A illustrates example contents of a system memory in an IHS for generating host groups in a cluster of IHSs, in accordance with one embodiment.

With reference now to FIG. 4A, there is shown one embodiment of example contents of system memory 114 of IHS 100. System memory 114 includes data, software, and/or firmware modules including application(s) 402, operating system (O/S) 404 and integrated service module (ISM) firmware 408. ISM firmware 408 is a software and/or firmware module that executes on processor 102 to facilitate generating host groups in IHS 100. System memory 114 further includes virtualization data 410 for VM, VMM, hypervisor and physical hosts, and VMM host list 412. Virtualization data 410 for VM, VMM, hypervisor and physical hosts contains data about the VMs running on IHS 100, the VMM associated with the VMs, hypervisor information, such as the type and version of hypervisor 212, and the physical host information about IHS 100, such as name and capabilities. VMM host list 412 contains identifiers for all of the physical hosts (IHSs) that are controlled by VMM 210 within networked computing system 200. VMM host list 412 is generated by VMM 210. System memory 114 can also include other data, software, and/or firmware modules.

Turning to FIG. 4B, there is shown one embodiment of example contents of RAC memory 184 of networked computing system 200. RAC memory 184 includes RAC management firmware 450 and host group firmware 452. RAC management firmware 250 is a software and/or firmware module that executes on RAC 180 to provide management functions that allow an administrator to deploy, monitor, manage, configure, update, troubleshoot, and/or remediate IHS 100. Host group firmware 252 is a software and/or firmware module that executes on RAC 180 to generate host groups and specifically to generate a host group that contains all of the physical hosts (IHSs) that are running VMs controlled by VMM 210.

RAC memory 184 further includes host groups 460, VMM host group 300, and error messages 470. Host groups 460, such as host groups 300 and 320 (FIG. 3B), are a set of physical hosts or IHSs that are grouped together for ease of management. VMM host group 300 contains all of the physical hosts (IHSs) that are running VMs controlled by VMM 210. Error messages 470 contain alerts and notification to a system administrator that certain problems have occurred during the generation of host groups.

FIGS. 5, 6, 7 and 8 illustrate flowcharts of exemplary methods 500, 600, 700 and 800, by which RAC 180 and processor 102 within the preceding figures performs different aspects of the processes that enable the one or more embodiments of the disclosure. Method 500 represents a computer-implemented method to collect VM, VMM, hypervisor, and physical host data. Method 600 represents a computer-implemented method to generate an initial VMM host group. Method 700 represents a computer-implemented method for validating host computers (IHSs) that are running VMs under control of a VMM. Method 800 represents a computer-implemented method for generating a VMM host group based on the completion of the processes in the preceding methods 500, 600, and 700.

The description of methods 500, 600, 700 and 800 is provided with general reference to the specific components illustrated within the preceding FIGS. 1-4B. Generally, method 500 is described as being implemented via processor 102 and particularly the execution of code provided by ISM firmware 408 within processor 102. While method 500 is described executing on IHS 100, it is understood that method 500 executes on each of the IHSs within network computing system 200. Method 600 is described as being implemented via RAC 180 and particularly the execution of code provided by host group firmware 452 within RAC 180. Method 700 is described as being implemented via processor 102 and particularly the execution of code provided by ISM firmware 408 within processor 102. Method 800 is described as being implemented via RAC 180 and particularly the execution of code provided by host group firmware 452 within RAC 180. It is however appreciated that certain aspects of the described methods may be implemented via other processing devices and/or execution of other code other than, or in addition to, those shown within the illustrative embodiments.

Figure 5:
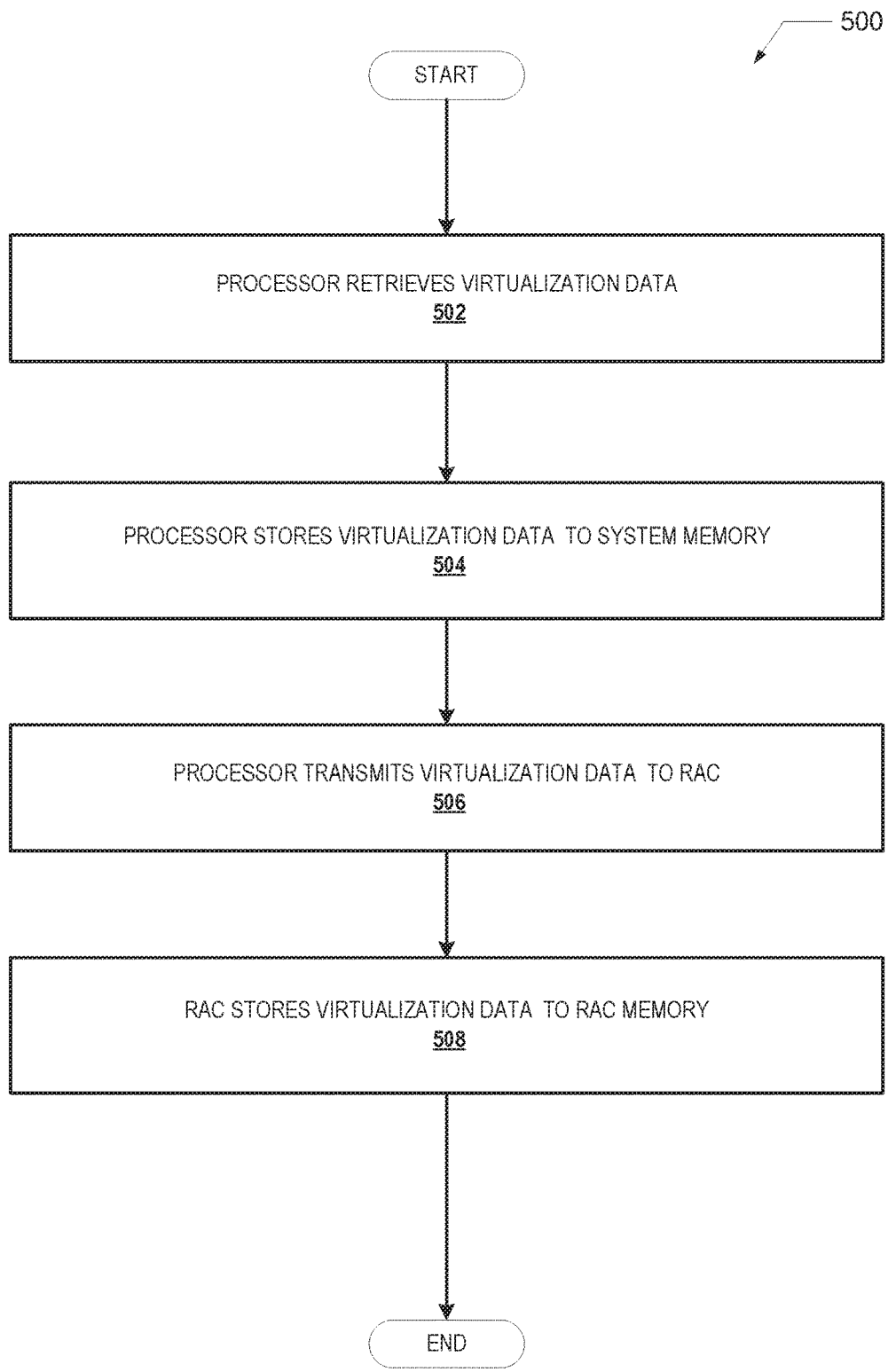
FIG. 5 is a flow chart illustrating one example of a method for collecting virtual machine data, virtual machine manager data and hypervisor data for an IHS.

Referring to the flow chart of FIG. 5, method 500 begins at the start block and proceeds to block 502 where processor 102 retrieves virtualization data 410 from components within IHS 100. The virtualization data 410 includes data regarding if IHS 100 is hypervisor/virtualization enabled, the type and version of the hypervisor, the name or hostname of the IHS or server, the VMM IHS data (if available). Virtualization data 410 further includes data regarding whether the IHS is the VMM physical host or server. Processor 102 can determine if IHS 100 is the VMM physical host by checking for VMM software packages and/or registry keys that are installed on IHS 100. Processor 102 stores the virtualization data 410 to system memory 114 (block 504), and processor 102 transmits the virtualization data 410 to RAC 180 (block 506). RAC 180 stores the received virtualization data as virtualization data 472 in RAC memory 184. Method 500 then ends.

Figure 6:
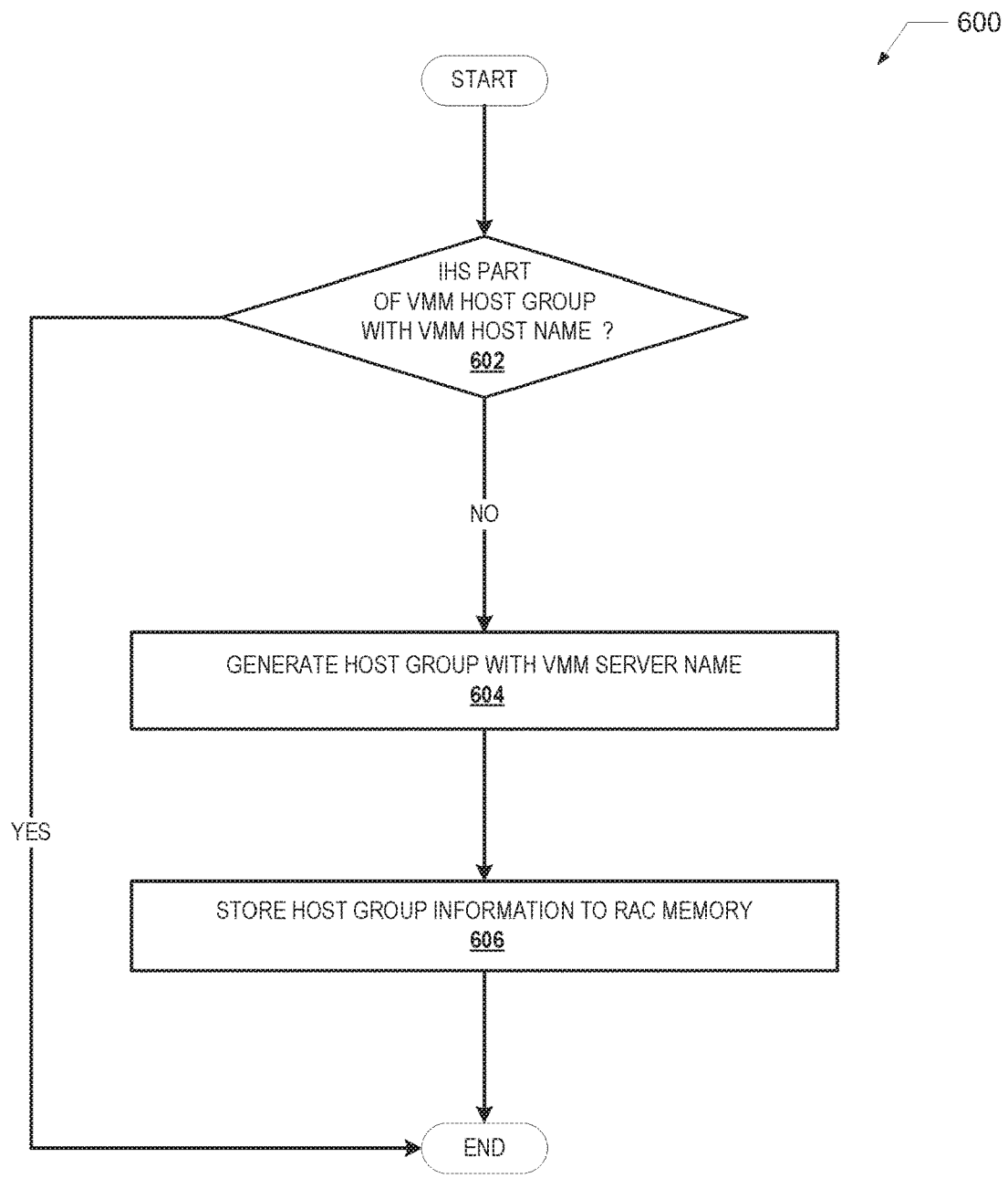
FIG. 6 is a flow chart illustrating one example of a method for generating a host group in a cluster of IHSs.

FIG. 6 illustrates a method 600 for generating a VMM host group. Method 600 creates a VMM host group when there are no VMM host groups that the IHS is part of. In one embodiment, each of the IHSs in networked computing system 200 can perform method 600. For clarity, method 600 will be described as being performed by IHS 100. Referring to the flow chart of FIG. 6, method 600 begins at the start block and proceeds to decision block 602 where RAC 180 determines if IHS 100 (i.e. the physical host) is part of the VMM host group 300. In response to determining that IHS 100 is part of VMM host group 300, method 600 terminates. In response to determining that IHS 100 is not part of the VMM host group 300, RAC 180 generates VMM host group 300 (block 604) and stores VMM host group 300 to RAC memory 184 (block 606). Method 600 then ends.

Figure 7:
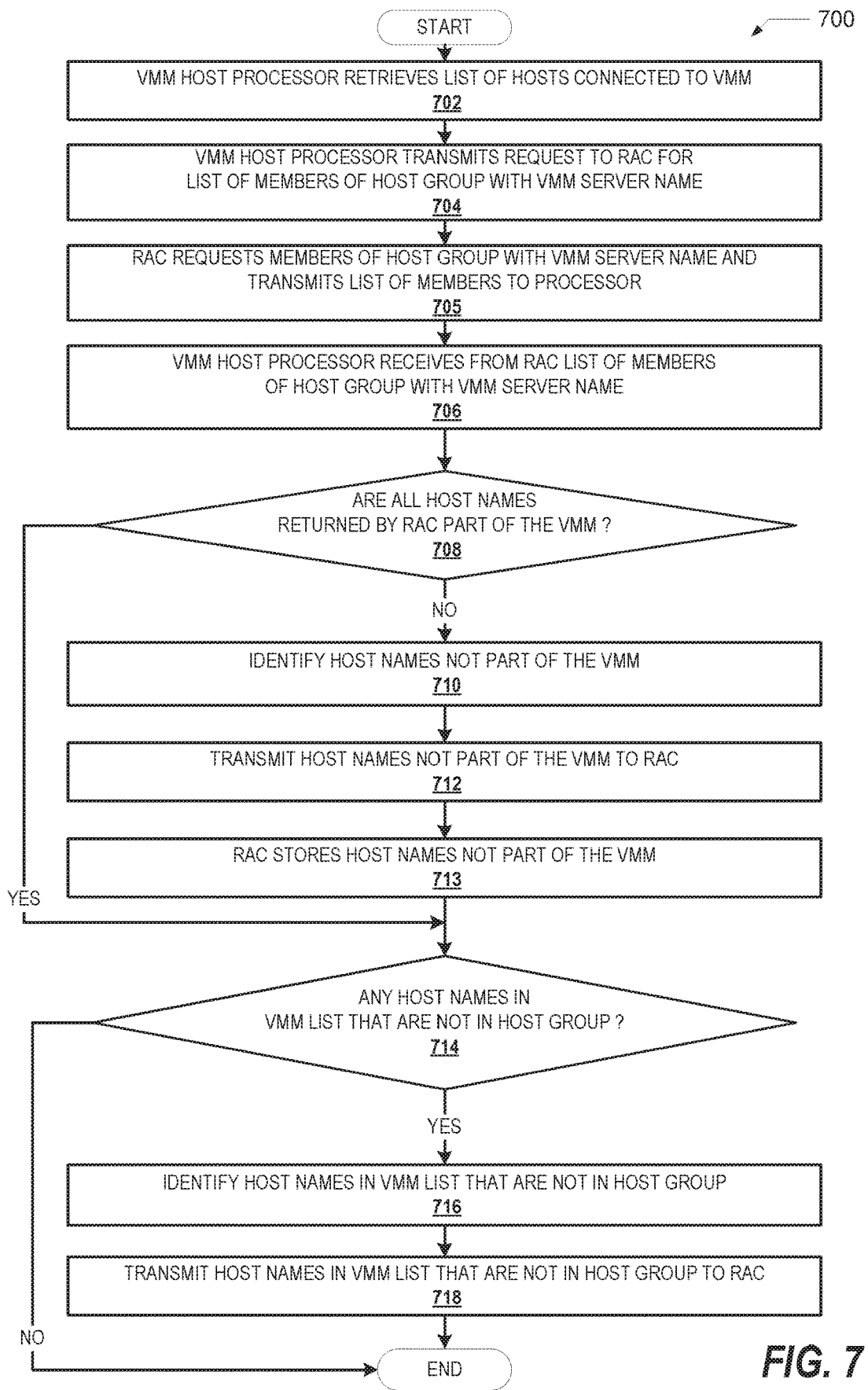
FIG. 7 is a flow chart illustrating one example of a method for validating host computers that are running virtual machines under control of a virtual machine manager.

FIG. 7 illustrates a method 700 for validating IHSs that are running VMs under control of a VMM. After the VMM host group 300 has been generated, there are two possible outcomes for IHS members of VMM host group 300. The first outcome is when the VMM host group is created with the VMM physical host name and the IHS is part of the VMM host group. The first outcome occurs (1) when the hypervisor is still connected to the VMM or (2) the physical host is where the VMM host is installed or (3) the physical host has the VMM host installed on a VM. The second outcome is when the VMM host group has been created with the VMM physical host name, but the IHS is not part of the VMM host group. The second outcome occurs when the hypervisor is detached from the VMM. Method 700 identifies the IHSs that are not part of the VMM and identifies physical host names in the VMM list that are not part of the VMM host group.

Referring to the flow chart of FIG. 7, method 700 begins at the start block and proceeds to block 702 where processor 102 retrieves VMM host list 412 from system memory 114. VMM host list 412 contains all of the physical hosts (IHSs) that are controlled by VMM 210 within networked computing system 200. VMM host list 412 is generated by VMM 210. Processor 102 transmits a request to RAC 180 for VMM host group 300 (block 704). At block 705, RAC 180 requests that all the members of the VMM host group 300 respond to a membership query. All members of VMM host group 300 return their IP Address, hostname of hypervisor, and VMM host name. When all members have responded, RAC 180 validates that the responses are for the VMM host and then passes the VMM host group 300 to processor 102. Processor 102 receives the VMM host group 300 from RAC 180 (block 706).

At decision block 708, processor 102 determines if all of the IHSs (physical hosts) of the VMM host group 300 are included in the VMM host list 412. In response to all of the IHSs (physical hosts) of the VMM host group not being included in the VMM host list, processor 102 identifies the IHSs (physical hosts) of the VMM host group that are not included in the VMM host list (block 710). Processor 102 transmits the IHSs (physical hosts) that are not included in the VMM host list 412 to RAC 180 (block 712). RAC 180 stores the IHSs that are part of VMM host group and not part of VMM host list 480 to RAC memory 184 (block 713).

After block 712 and in response to all of the IHSs (physical hosts) of the VMM host group being included in the VMM host list, processor 102 determines if any of the IHSs (physical hosts) of the VMM host list are not included in the VMM host group (decision block 714). In response to determining that at least one IHS of the VMM host list 412 is not included in the VMM host group 300, processor 102 identifies the IHSs (physical hosts) of the VMM host list that are not included in the VMM host group (block 716). Processor 102 transmits the IHSs (physical hosts) of the VMM host list that are not included in the VMM host group to RAC 180 (block 718). RAC 180 stores the IHSs that are part of VMM host list and not part of VMM host group 482 to RAC memory 184. Method 700 then terminates. In response to determining that there are no IHSs of the VMM host group 300 that are not included in the VMM list 412 (from decision block 714), method 700 ends.

Figure 8:
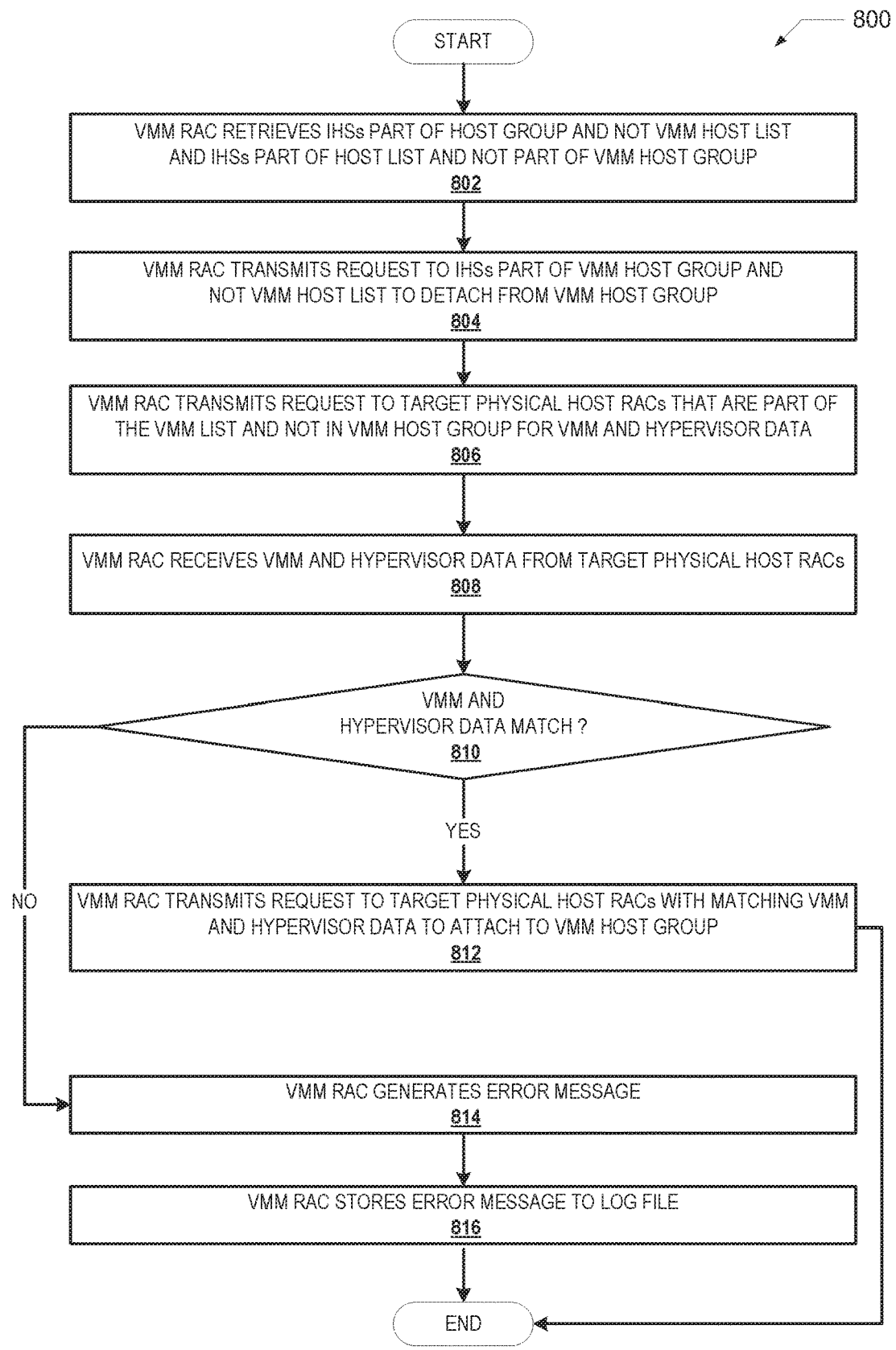
FIG. 8 is a flow chart illustrating one example of a method for generating a virtual machine manager host group in a cluster of IHSs.

FIG. 8 illustrates a method 800 for generating a VMM host group. Referring to the flow chart of FIG. 8, method 800 begins at the start block and proceeds to block 802 where RAC 180 retrieves from RAC memory 184, IHSs that are part of VMM host group and not part of VMM host list 480. At block 802, RAC 180 also retrieves IHSs that are part of VMM host list and not part of VMM host group 482. RAC 180 transmits to each of the IHSs (target physical hosts) that are part of the VMM host group and not part of VMM host list 480, a request to detach from the VMM host group (block 804). RAC 180 transmits to each of the IHSs (target physical hosts) RACs that are part of the VMM host list and that are not part of VMM host group 482, a request for their respective VMM and hypervisor data (block 806).

RAC 180 receives, from the IHSs (target physical hosts) RAC that are part of the VMM host list and not in the VMM host group, VMM and hypervisor data (block 808). The VMM and hypervisor data is used to identify the target physical hosts that are part of the VMM list, but are not in the VMM host group. RAC 180 determines if the VMM and hypervisor data received from the IHSs (target physical hosts) match the VMM and hypervisor data of IHS 100 (decision block 810). In response to the VMM and hypervisor data received from the IHSs (target physical hosts) matching the VMM and hypervisor data, RAC 180 transmits to each of the IHSs (target physical hosts) having matching VMM and hypervisor data, a request to attach to the VMM host group 300 (block 812). Method 800 then ends. In response to the VMM and hypervisor data received from the IHSs (target physical hosts) not matching the VMM and hypervisor data, RAC 180 generates an error message (block 814) and stores the error message to a log file (block 816). Method 800 then terminates.

After method 800 has completed, RAC 180 would have a VMM host group (i.e. host group 300) with the VMM host name and containing all of the IHSs running VMs in the VMM. In other words, the members of host group 300 are the IHSs running VMs under control of VMM 210.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method for attaching and detaching physical hosts to/from virtual machine manager (VMM) host groups associated with a VMM in a cluster of information handling systems (IHSs), the method comprising:
    identifying, by a processor, (i) first target physical hosts that are part of a VMM host group but are not part of a VMM host list, and (ii) second target physical hosts from the VMM host list that are not included in the VMM host group;
    wherein a VMM host group comprises all of the physical hosts that are running virtual machines (VMs) that are controlled by the VMM, and wherein the VMM host list is generated by the VMM and contains identifiers for all of the physical hosts that are controlled by the VMM within a networked computing system;
    wherein the identifying comprises:
        determining that at least one the physical hosts of the VMM host group are not included in the VMM host list; and
        in response to determining that at least one the physical hosts of the VMM host group is not included in the VMM host list: identifying the physical hosts of the VMM host group that are not included in the VMM host list; and transmitting an indication of the physical hosts of the VMM host group that are not included in the VMM host list to the controller;
    storing the identified first target physical hosts and second target physical hosts to a remote access controller (RAC) memory;
    retrieving, by a RAC from the RAC memory, first identifying data of the first target physical hosts;
    retrieving, by the RAC, second identifying data of the second target physical hosts:
    transmitting, by the RAC, to each of the first target physical hosts a request to detach from the VMM host group; and
    transmitting, by the RAC, to each of the second target physical hosts, a request to attach to the VMM host group.

2. The method of claim 1, wherein prior to transmitting the request to attach to the VMM host group, the method further comprises:
    transmitting, to each of the second target physical hosts, a request for VMM and hypervisor data from the second target physical host; and
    receiving VMM and hypervisor data from the second target physical hosts, the VMM and hypervisor data used to identify the target physical hosts that are part of the VMM host list, but are not in the VMM host group.

3. The method of claim 2, further comprising:
    determining if the VMM and hypervisor data received from each of the second target physical hosts match VMM and hypervisor data of a source VMM physical host that transmitted the request and received the VMM and hypervisor data;
    transmitting the request to attach to the VMM host group, in response to the VMM and hypervisor data received from the second target physical hosts matching the VMM and hypervisor data; and
    in response to the VMM and hypervisor data from a second target physical host not matching the VMM and hypervisor data of the VMM physical host, generating an error message.

4. The method of claim 1, wherein:
    the identifying comprises:
        transmitting from the processor to the remote access controller (RAC) a request for the VMM host group of the VMM operating as a VMM host;
        in response to the request for the VMM host group:
            transmitting, by the RAC, a request to all members of the VMM host group to respond to a membership query;
            validating, by the RAC, that responses received from each member of the VMM host group is for the VMM; and
            transmitting the VMM host group to the processor;
        identifying, by the processor, the first target physical hosts that are part of the VMM host group but are not part of the VMM host list;
        identifying the second target physical hosts of the VMM host list that are not included in the VMM host group; and
    the method further comprises:
    determining if a first physical host associated with a VM that is controlled by the VMM is part of a the VMM host group;
    in response to determining that the first physical host is not part of the VMM host group:
        adding the first physical host to the VMM host group; and
        storing VMM host group to the RAC memory.

5. The method of claim 1, further comprising:
    retrieving a first VMM host list from a system memory;
    transmitting a request to the controller for the VMM host group;
    receiving the VMM host group from the controller;
    determining if all of the physical hosts of the VMM host group are included in the first VMM host list;
    in response to at least one of the physical hosts of the VMM host group not being included in the first VMM host list, identifying the physical hosts that are not included in the first VMM host list, but are in the VMM host group, as the first target physical hosts; and
    transmitting an indication of the first target physical hosts to the controller.

6. The method of claim 1, further comprising:
collecting, via a processor, identifying data associated with a first VMM, a first set of virtual machines (VMs), a first hypervisor, and a first physical host;
storing the identifying data associated with the first VMM, the first set of virtual machines (VMs), the first hypervisor and the first physical host to a system memory; and
transmitting the identifying data associated with the first VMM, the first set of virtual machines (VMs), the first hypervisor and the first physical host to a controller.

7. An information handling system (IHS) comprising:
a processor communicatively coupled to a system memory comprising firmware:
a remote access controller (RAC) communicatively coupled to the processor and to a RAC memory device, the RAC including first firmware executing thereon for attaching and detaching physical hosts to/from virtual machine manager (VMM) host groups associated with a VMS,
wherein the processor executes the firmware, which configures the processor to:
determine if any of the physical hosts of a VMM host group are not included in a VMM host list; and
in response to determining that at least one of the physical hosts of the VMM host group is not included in the VMM host list: identify the physical hosts of the VMM host group that are not included in the VMM host list; and transmit ab indication of the physical hosts of the VMM host group that are not included in the VMM host list to the RAC; and
wherein the first firmware configures the RAC to:
retrieve, from a controller memory, first identifying data of first target physical hosts that are part of the VMM host group, but not on the VMM host list, wherein the VMM host group comprises all of the physical hosts that are running virtual machines (VMs) that are controlled by the VMM, and wherein the VMM host list is generated by the VMM and contains identifiers for all of the physical hosts that are controlled by the VMM within a networked computing system;
retrieve second identifying data of second target physical hosts that are part of the VMM host list, but are not part of the VMM host group;
transmit, to each of the first target physical hosts a request to detach from the VMM host group; and
transmit, to each of the second target physical hosts, a request to attach to the VMM host group.

8. The information handling system of claim 7, wherein prior to the RAC transmitting the request to attach to the VMM host group, the first firmware further configures the RAC to:
transmit, to each of the second target physical hosts, a request for VMM and hypervisor data from the second target physical host; and
receive the VMM and hypervisor data from the second target physical hosts, the VMM and hypervisor data used to identify the target physical hosts that are part of the VMM host list, but are not in the VMM host group.

9. The information handling system of claim 8, wherein the first firmware further configures the RAC to:
determine if the VMM and hypervisor data received from each of the second target physical hosts match VMM and hypervisor data of a source VMM physical host that transmitted the request and received the VMM and hypervisor data; and in response to the VMM and hypervisor data from a second target physical host not matching the VMM and hypervisor data of the VMM physical host, generate an error message.

10. The information handling system of claim 7, wherein:
the processor identifies (i) the first target physical hosts that are part of a VMM host group but are not part of a VMM host list, and (ii) the second target physical hosts from the VMM host list that are not included in the VMM host group, by:
transmitting from the processor to the RAC a request for the VMM host group of the VMM operating as a VMM host;
in response to receiving the VMM host group, the processor:
identifies the first target physical hosts;
identifies the second target physical hosts; and
the first firmware further configures the RAC to:
store the identified first target physical hosts and second target physical hosts to a RAC memory;
in response to the request for the VMM host group:
transmitting, by the RAC, a request to all members of the VMM host group to respond to a membership query;
validating, by the RAC, that responses received from each member of the VMM host group is for the VMM;
determine if a first physical host having a VM controlled by the VMM is part of first the VMM host group;
in response to determining that the first physical host is not part of the VMM host group:
add the first physical host to the VMM host group;
store VMM host group to the RAC memory; and
transmit the VMM host group to the processor.

11. The information handling system of claim 7, wherein the processor includes second firmware executing thereon, the second firmware configuring the processor to:
retrieve a first VMM host list from a system memory;
transmit a request to the controller for the VMM host group;
receive the VMM host group from the controller;
determine if all of the physical hosts of the VMM host group are included in the first VMM host list;
in response to at least one of the physical hosts of the VMM host group not being included in the first VMM host list, identify the physical hosts that are not included in the first VMM host list, but are in the VMM host group, as the first target physical hosts; and
transmit an indication of the first target physical hosts to the controller.

12. The information handling system of claim 7, wherein the processor includes second firmware executing thereon, the second firmware configuring the processor to:
collect identifying data associated with a first VMM, a first set of virtual machines (VMs), a first hypervisor, and a first physical host;
store the identifying data associated with the first VMM, the first set of virtual machines (VMs), the first hypervisor and the first physical host to a system memory; and
transmit, to a controller, the identifying data associated with the first VMM, the first set of virtual machines (VMs), the first hypervisor and the first physical host.

13. A virtual machine manager (VMM) host group system for a network of information handling systems (IHSs) comprising:

a processor communicatively coupled to a system memory comprising firmware;
a remote access controller (RAC) communicatively coupled to the processor and to a RAC memory device, the RAC including first firmware executing thereon for generating host groups;
wherein the processor executes the firmware, which configures the processor to:
determine if any of the physical hosts of a VMM host group are not included in a VMM host list; and
in response to determining that at least one of the physical hosts of the VMM host group is not included in the VMM host list: identify the physical hosts of the VMM host group that are not included in the VMM host list; and transmit an indication of the physical hosts of the VMM host group that are not included in the VMM host list to the RAC; and
wherein the first firmware configures the RAC to:
retrieve, from a controller memory, first identifying data of first target physical hosts that are part of the VMM host group associated with a VMM Put not on DB the VMM host list,
wherein the VMM host group comprises all of the physical hosts that are running virtual machines (VMs) that are controlled by the VMM, and wherein the VMM host list is generated by the VMM and contains identifiers for all of the physical hosts that are controlled by the VMM within a networked computing system;
retrieve second identifying data of second target physical hosts that are part of the VMM host list, but are not part of the VMM host group;
transmit, to each of the first target physical hosts, a request to detach from the VMM host group; and
transmit, to each of the second target physical hosts, a request to attach to the VMM host group.

14. The VMM host group system of claim 13, wherein prior to transmitting the request to attach to the VMM host group, the first firmware further configures the RAC to:
transmit, to each of the second target physical hosts, a request for VMM and hypervisor data from the second target physical hosts; and
receive VMM and hypervisor data from the second target physical hosts, the VMM and hypervisor data used to identify the target physical hosts that are part of the VMM host list, but are not in the VMM host group.

15. The VMM host group system of claim 14, wherein the first firmware further configures the RAC to:
determine if the VMM and hypervisor data received from each of the second target physical hosts match VMM and hypervisor data of a source VMM physical host that transmitted the request and received the second VMM and hypervisor data; and
in response to the VMM and hypervisor data from a second target physical host not matching the VMM and hypervisor data of the source VMM physical host, generate an error message.

16. The VMM host group system of claim 13, wherein:
the processor identifies (i) the first target physical hosts that are part of a VMM host group but are not part of a VMM host list, and (ii) the second target physical hosts from the VMM host list that are not included in the VMM host group, by:
transmitting from the processor to the RAC a request for the VMM host group of the VMM operating as a VMM host;
in response to receiving the VMM host group, the processor:
identifies the first target physical hosts;
identifies the second target physical hosts; and
the first firmware further configures the RAC to:
store the identified first target physical hosts and second target physical hosts to a RAC memory;
in response to the request for the VMM host group:
transmitting, by the RAC, a request to all members of the VMM host group to respond to a membership query;
validating, by the RAC, that responses received from each member of the VMM host group is for the VMM;
determine if a first physical host having a VM controlled by the VMM is part of the VMM host group;
in response to determining that the first physical host is not part of the VMM host group:
add the first physical host to the VMM host group;
store VMM host group to the RAC memory; and
transmit the VMM host group to the processor.

17. The VMM host group system of claim 13, wherein the processor includes second firmware executing thereon, the second firmware configuring the processor to:
retrieve a first VMM host list from a system memory;
transmit a request to the controller for the VMM host group;
receive the VMM host group from the controller;
determine if all of the physical hosts of the VMM host group are included in the first VMM host list;
in response to at least one of the physical hosts of the VMM host group not being included in the first VMM host list, identify the physical hosts that are not included in the first VMM host list, but are in the VMM host group as the first target physical hosts; and
transmit an indication of the first target physical hosts to the controller.

* * * * *